Sept. 8, 1959 — D. C. GOFF — 2,903,018
PARTING AGENT FOR CONDUITS
Filed Dec. 22, 1954
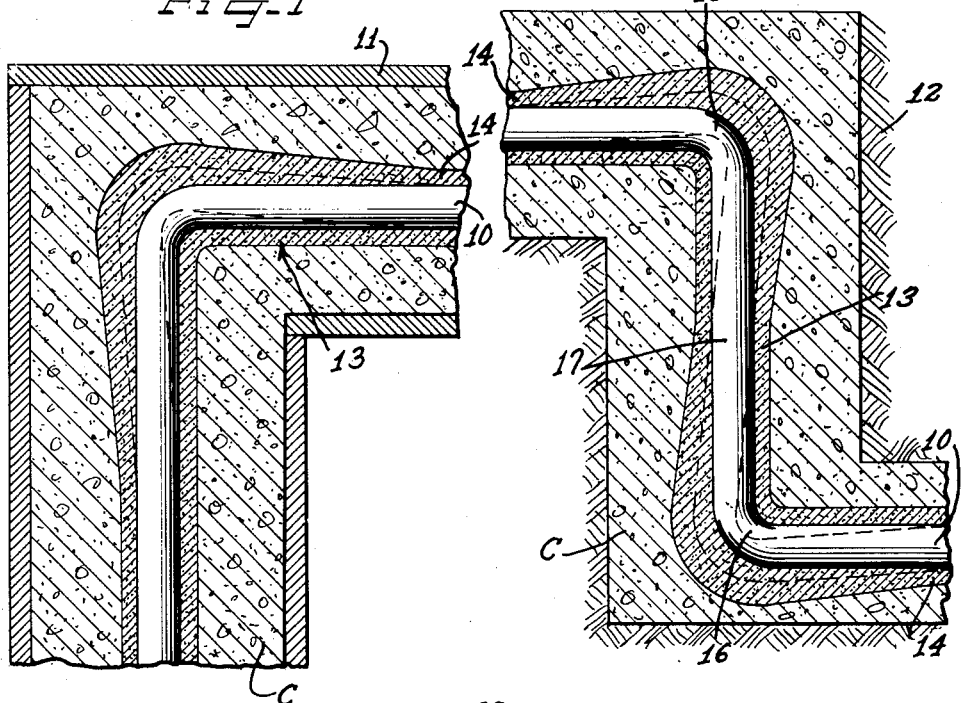
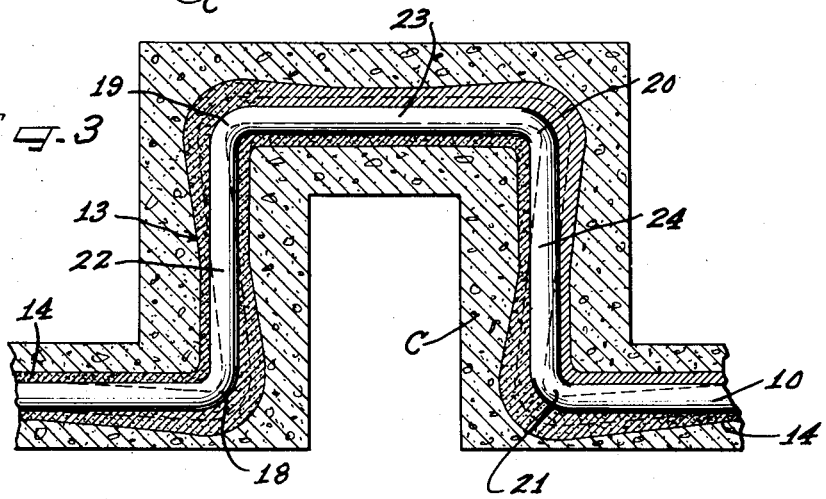
Inventor
DAVID C. GOFF
by Attys.

United States Patent Office 2,903,018
Patented Sept. 8, 1959

2,903,018

PARTING AGENT FOR CONDUITS

David C. Goff, La Grange, Ill., assignor to Zonolite Company, Chicago, Ill., a corporation of Montana Application December 22, 1954, Serial No. 477,083

5 Claims. (Cl. 138—66)

The present invention relates to a new and improved parting agent for use at an interface between a pipe and an insulating material, and particularly relates to a parting agent composition which permits radial and axial expansive movement of a pipe embedded in a monolithic cementitious insulating material.

In employing lightweight concrete as an insulating material for pipes and similar conduits, it is generally necessary to provide a parting agent or material around the periphery of the pipe before embedding the same in the concrete. This is done to permit limited axial and radial expansive movement of the pipe in the concrete under varying temperature conditions.

On long, straight runs of pipe corrugated paper or a similar material is usually wrapped about the pipe to provide this parting medium.

Non-straight sections of pipe, such as loops or bends, however, usually require the use of a parting agent of a greater thickness and of a soft compressive nature to compensate for the relatively greater amount of expansion movement which occurs at such points. Expansive movement of a pipe at loops or bends is usually provided for by either constructing a special housing about the bend or loop which is filled with a discrete or loose insulating material; or, the loop or bend is enveloped in a resilient, fibrous insulating material prior to pouring the lightweight concrete around the pipe.

Some particulate or fibrous parting materials, including certain papers, although they permit expansive pipe movement, do not always effectively prevent water movement along the outer periphery of a pipe to which they are applied. Water movement most often occurs on return lines or cold pipes, rather than on pipes carrying steam. The water which collects and moves about such a pipe not uncommonly tends to be absorbed by the ambient insulating concrete. In some instances this tends to diminish the insulating ability of the concrete when water concentration becomes high enough.

According to the general features of the instant invention, a new and improved parting agent or medium is provided for application to pipes which are to be embedded in a monolithic lightweight cementitious insulating material. The present parting agent composition is economical to manufacture; easy to apply to a pipe; self-sustaining; allows radial and axial expansive movement of a pipe coated therewith when embedded in a monolithic insulating concrete; and, effectively prevents or greatly minimizes water movement between the outer periphery of a pipe and a concrete insulation in which the pipe is embedded.

A particular feature of this invention is the provision of a parting agent for application to pipes or the like which comprises a mixture of a lightweight aggregate and grease.

An important object of this invention is to provide a parting agent for pipes which are to be embedded in a lightweight insulating concrete and to a method for employing the parting agent in association with an insulated conduit.

A further object is the provision of a new and improved parting agent composition which allows radial and axial expansive pipe movement.

Another object is the provision of a parting agent material which is self-sustaining and may be easily applied manually to the surface of a pipe by troweling or the like with no need for additional supporting means such as is necessary with the majority of parting materials used heretofore.

Still another object is to provide a new and improved parting agent composition in the form of a mixture of a lightweight aggregate and a grease which effectively prevents or materially minimizes water movement along the outer periphery of a pipe.

Yet another object is the provision of a new and improved parting agent in the form of a mixture of a lightweight aggregate and grease which not only materially limits or prevents water movement along the periphery of a pipe, but also tends to waterproof an insulating concrete contiguous therewith minimizing water absorption by the concrete.

Other objects, features and advantages of the present invention will be readily apparent from the following detailed description of a preferred embodiment thereof taken in conjunction with the accompanying sheet of drawings, in which:

Figure 1 is a fragmentary, longitudinal, sectional view, with parts in section and parts in elevation, illustrating in an exaggerated manner the instant parting agent in association with a lightweight concrete in insulating an L-bend in a pipe;

Figure 2 is a view similar to Figure 1 illustrating the instant parting agent employed in insulating a Z-bend in a pipe; and Figure 3 is a view similar to Figure 1 illustrating the use of the instant parting agent with a lightweight concrete in insulating a U-bend in a pipe.

In accordance with the general features of the instant invention a new and improved parting agent or medium is provided for application to the outer periphery of a pipe which is to be embedded in a lightweight, monolithic concrete insulation. This parting agent composition comprises a mixture of a lightweight aggregate and a grease, and is of a sufficiently plastic nature as to lend itself to being applied manually to the outer periphery of a pipe and remain self-sustaining thereon.

The lightweight aggregates which may be employed in this composition comprise vermiculite, perlite, pumice and lightweight slag. Of the named lightweight aggregates vermiculite and pumice are preferred. Vermiculite, however, has been found particularly adapted for use in the instant parting agent because of its smooth, lamellar structure which permits slippage of the individual particles of the aggregate over one another giving vermiculite an inherent lubricating quality which greatly aids in facilitating axial expansive pipe movement. Although this invention will be described particularly as to the use of vermiculite as the lightweight aggregate in the instant parting agent, it will, of course, be appreciated that others of the named aggregates may also be employed.

The greases with which the lightweight aggregate is mixed comprise mineral or petroleum grease as well as animal fats and hydrogenated vegetable oils or the like. Petroleum greases, however, are preferred, for obvious economic reasons and also because of their keeping qualities and resistance to oxidation which may cause animal or vegetable oils to become rancid.

The grease with which the lightweight aggregate is mixed should preferably have a fairly high viscosity, such as the viscosity of ordinary axle grease, so as to produce a mixture displaying a plasticity such that the mixture may be easily troweled or otherwise manually applied to the outer periphery of a pipe and remain affixed thereto in a self-sustaining form while the pipe is being invested in a lightweight insulating concrete slurry.

Although the exact ratio of lightweight aggregate to grease in the mixture is not critical, I have found that a preferred operating range constitutes a mixture comprising from about 20 to 60% by weight of a lightweight aggregate and from 80 to 40% by weight of grease. Within this wider range a preferred mixture comprises from about 25 to 40% by weight of the lightweight aggregate and from about 75 to 60% by weight of grease. A composition mixture which has been found satisfactory for some insulating purposes comprises approximately about 50% by weight of a lightweight aggregate and about 50% by weight of grease; that is, approximately a 1:1 ratio. For optimum results in general, however, I have found that a mixture comprising a minor portion by weight of a lightweight aggregate and a major portion by weight of grease gives superior parting agent results.

The exact ratio of lightweight aggregate to grease will vary to a great extent, of course, depending upon the viscosity or plasticity of the material desired. When a greater portion of the lightweight aggregate is used in relation to the grease relatively high viscosities result, while high percentages of grease in relation to the aggregate produce a parting agent mixture having a relatively low viscosity. Therefore, the exact ratio of aggregate to grease will vary according to the viscosity of the composition desired.

Although any number of methods may be employed in admixing the lightweight aggregate with the grease to produce the parting agent composition, I prefer to combine the lightweight aggregate with the grease while the latter is in a molten or liquid state and thereafter mechanically working or kneading the mixture to produce a parting composition having the aggregate uniformly dispersed therethrough.

To accomplish this the grease is first heated to from about 150° to 200° F. and allowed to melt. Thereafter the melted grease is poured over a lightweight aggregate, such as expanded vermiculite, and mixed well manually. Thereafter, the mixture is mechanically worked or kneaded, such as by extrusion through a reduced diameter orifice, to provide a parting agent composition throughout which the aggregate is uniformly dispersed. Finally, after the kneading or extrusion operation, the mixture is packed in suitably sized containers and allowed to harden.

The following examples, given by way of illustration only and not by way of limitation, more clearly describe the manner in which the instant parting agent composition is produced:

*Example I*

Five pounds of "Parmo" (a petroleum jelly lubricating grease manufactured by the Esso Standard Oil Company), was melted by placing containers of the grease in a drying chamber at 150° to 200° F. The melted grease was poured over five pounds of No. 4 expanded vermiculite in a large container and mixed well by hand. This mixture was extruded once through a 1½ inch square nozzle 6 inches long, and then extruded through a ⅜ inch diameter nozzle 4 inches long. The extruder employed was of the sausage grinder type with a 2½ inch diameter auger. The material was recirculated through the ⅜ inch diameter nozzle 6 to 10 times until it became nearly fluid after which it was placed in suitable containers and allowed to cool and harden into a plastic mass containing about 50% by weight of vermiculite and 50% by weight of grease.

*Example II*

Nine pounds of "Parmo" were melted; admixed with 6 pounds of No. 4 expanded vermiculite; and treated in the same manner as described under Example I to produce a parting agent composition comprising about 66⅔% by weight of grease and about 33⅓% by weight of vermiculite.

*Example III*

Four pounds of "Estan No. 2" (a lime-base grease, available in various viscosities, produced by the Esso Standard Oil Company), were melted by placing containers of the grease in a drying chamber at 150° to 200° F. The melted "Estan No. 2" grease was then poured over 2 pounds of No. 4 expanded vermiculite in a suitable container and mixed well by hand to produce a mixture comprising about 66⅔% by weight of grease and about 33⅓% by weight of vermiculite. The mixture was thereafter mechanically worked by extrusion in the same manner as disclosed in Example I.

*Example IV*

Five pounds of the mixture produced in Example III were melted at elevated temperatures and admixed with 0.55 pound of No. 4 expanded vermiculite to produce a parting agent composition comprising about 60% by weight of grease and 40% by weight of vermiculite.

*Example V*

About 4 pounds of the parting agent mixture produced in Example IV were melted and admixed with 0.8 pounds of No. 4 expanded vermiculite to produce a composition comprising about 50% by weight of grease and about 50% by weight of vermiculite.

*Example VI*

Three pounds of the parting agent material produced in Example V were melted and admixed with 0.75 pounds of No. 4 expanded vermiculite producing a parting agent composition consisting essentially of about 40% by weight grease and approximately 60% by weight of vermiculite.

*Example VII*

About 3.6 pounds of "Estan No. 0" (a lime-base grease produced by the Esso Standard Oil Company) were melted by placing cans of the material in a heating chamber at from about 150° to 200° F. The melted grease was then poured over about 2.4 pounds of No. 4 expanded vermiculite in a large container and mixed well by hand. Thereafter, the mixture was mechanically worked by extrusion in the same manner as disclosed under Example I, to produce a parting agent composition comprising about 60% by weight of grease and about 40% by weight of vermiculite.

*Example VIII*

About 4.5 pounds of the parting agent composition produced under Example VII were melted and admixed with about 2.25 pounds of No. 4 expanded vermiculite to produce a parting agent composition consisting essentially of about 40% by weight of grease and about 60% by weight of vermiculite.

All of the parting agent compositions produced in the above Examples I–VIII were allowed to harden for several days in their containers and were then tested by troweling onto steel plates and steel and cast iron pipe to observe their relative plasticity, adhesiveness, and workability. It was found that the greater the percentage of the lightweight aggregate in relation to the grease, the greater the viscosity and vice versa. All preparations were found to be self-sustaining and efficiently permitted axial and radial movement of pipes embedded in insulating concretes.

The type of insulating media with which the instant parting agent composition may be employed may vary. As noted previously, however, the instant parting agent is particularly adapted to be applied to an interface between a pipe and a lightweight cementitious insulating material in which the pipe is to be embedded. The preferred type of lightweight insulating concrete comprises a mixture consisting essentially of a hydration settable binder, such as Portland cement, a lightweight aggregate, such as vermiculite, pumice, or the like, and a waterproofing stabilizer such as an asphalt emulsion, as described in Goff Patent 2,355,966. Examples of other cementitious insulating compositions which may be employed are found in my copending application, Serial No. 455,091, filed September 9, 1954.

The amount of the present parting agent which is applied to a pipe will vary with the shape and contour of the installation to be insulated. On straight runs of pipe, that is ones having no bends, elbows, loops or the like, a layer having a thickness of less than about 1 inch, and preferably in the range of about ⅛ inch, is sufficient to allow radial and axial expansive movement of the pipe within a lightweight concrete insulating medium.

On non-straight pipe installations, however, such as L bends, Z bends, U bends, loops and the like, substantially greater thicknesses of the parting agent around the periphery of the pipe is required. Such greater thicknesses are required to compensate for the greater lateral pipe displacement occurring at such points through combined axial and radial expansion of the pipe on either side of the bend or loop. In the general area of such non-straight pipe installations, it is preferred to provide a layer of the instant parting agent around the periphery of the pipe of 1 to several inches in thickness. This allows extensive axial movement of the pipe and tends to act as a cushion during pipe expansion. Likewise, the parting agent mixture which is applied to loops or bends may desirably have a greater viscosity or stiffness than that applied on straight runs in order to present a greater cushioning medium into pipe expansion. In such cases, parting agents containing relatively high percentages of vermiculite to grease are preferred.

The manner in which the instant parting agent may be employed in association with a lightweight insulating concrete to provide a heat insulating medium around a pipe or conduit is shown in Figures 1–3. As seen therein, a pipe or conduit 10 to be insulated is suspended or supported in spaced relation from the walls of a suitable concrete-retaining form. This concrete-retaining form may comprise a conventional channel-type form having the bottom and side walls produced from wood or the like, as shown generally at 11 in Figure 1, or, if desired, the concrete-retaining form may simply comprise a suitable ditch dug in the soil as shown generally at 12 in Figure 2. In the latter case, an insulating concrete preferably of the type described in my copending application, Serial No. 455,091, filed September 9, 1954 is employed.

After the pipe 10 has been suitably supported in spaced relation to the walls of the concrete retaining form 11 or ditch 12, the instant parting agent, shown generally at 13, is applied to the outer periphery of the pipe. Application of the parting agent 13, as noted before, may be effected by troweling the mixture onto the outer periphery of the pipe.

After the parting agent 13 is applied to the pipe 10 a suitable insulating concrete C is poured around the pipe and allowed to harden. The concrete retaining forms may optionally be removed after the concrete has set as shown in Figure 3.

On straight runs of pipe, as at 14, the parting agent 13 preferably has a thickness of only a fraction of an inch. In the case of a simple 90° L bend, as shown in Figure 1, the parting agent 13 at the L bend or elbow is of a greater thickness than on the straight run 14. This is to allow greater lateral expansive displacement as shown in phantom dotted line outline.

When employed in association with a Z bend, such as in Figure 2, both of the 90° corners or elbows, such as 15 and 16, as well as the pipe or conduit 17 communicating therebetween are provided with a comparatively thicker layer of the instant parting agent than employed on the straight runs. The thicker layer of the parting agent 13 in the vicinity of the elbows 15 and 16 and the pipe 17 is provided to compensate for the greater amount of lateral displacement caused in these areas by diametrically opposed pipe expansion as shown in phantom outlines in Figure 2.

In employing the instant parting agent in association with a U bend, or the like, as seen in Figure 3, the entire bend including the four 90° elbows, such as, 18, 19, 20 and 21, as well as the straight lengths of pipe 22, 23 and 24 communicating therebetween, are provided with a relatively thick layer of the instant parting agent preferably of a thickness ranging from about 1 to several inches to allow significant lateral expansive pipe movement caused by expansion from both ends of the bend as shown in dotted phantom outline in Figure 3.

In addition to being inexpensive and simple to produce, the instant parting agent composition has a number of distinct advantages which are not present in the parting mediums employed heretofore. An important one of these is its self-sustaining nature arising from its plastic properties. With the present parting agent composition there is no need to provide extraneous supporting means to secure it to the outer periphery of a pipe nor is there any requirement for additional structural forms around bends, elbows or loops, as has been conventionally employed heretofore in retaining loose or particulate insulating materials at such non-straight pipe installations.

The grease which forms a basic component of the present mixture acts to protect the outer periphery of a pipe against oxidation. Further, when the present lightweight aggregate-grease mixture is applied to the surface of a steam pipe, or the like, carrying fluids at elevated temperatures, the volatiles from the grease tend to be driven off into the relatively porous insulating concrete contiguous with the outer periphery of the pipe. This produces a water-resistant area in the concrete immediately adjacent the pipe and aids in increasing the over-all waterproof nature of the concrete. When volatiles are driven off the grease a small void sometimes results between the pipe and concrete. Such small voids, if any, are spanned or filled by a more or less finely intermeshed reticulate but substantially imperforate network of the lightweight aggregate employed and the non-volatile constituents of the grease. This network filling whatever void may exist prevents or materially restricts water movement along the outer periphery of the pipe, but yet functions effectively as a cushion in allowing expansive pipe movement.

It will, of course, be appreciated that water movement along pipes having a sufficiently high temperature to drive off volatiles from the parting agent mixture, as a rule, will not occur to any appreciable extent, for water movement usually occurs only generally around or along relatively cool pipes, such as steam return lines, hot water pipes or the like, the temperature of which, generally, is not sufficiently high to drive off volatiles in the grease. Therefore, those pipes along which water movement most frequently occurs will have a coating of water-impervious grease provided around the periphery thereof to prevent water movement.

It will be understood that modifications and variations may be effected without departing from the scope of the novel concepts of the present invention.

I claim as my invention:

1. A conduit assembly comprising a run of pipe, a relatively porous monolithic embedment receiving said run of pipe in spaced relation, and a parting agent comprising a self-sustaining plastic mixture of a lightweight aggregate and grease conforming to the outer periphery of said pipe and filling the space between said pipe and said embedment, said parting agent being sufficiently plastic to permit radial and axial expansive movement of said pipe therein.

2. A conduit assembly comprising a run of pipe, a relatively porous monolithic embedment receiving said run of pipe in spaced relation, and a parting agent comprising a self-sustaining plastic mixture of vermiculite and grease conforming to the outer periphery of said pipe and filling the space between said pipe and said embedment, said parting agent being sufficiently plastic to permit radial and axial expansive movement of said pipe therein.

3. A conduit assembly comprising a run of pipe, a relatively porous monolithic embedment receiving said run of pipe in spaced relation, and a parting agent comprising a self-sustaining plastic mixture of a lightweight aggregate and grease conforming to the outer periphery of said pipe and filling the space between said pipe and said embedment, said parting agent consisting of 20 to 60% by weight of said aggregate and from 80 to 40% by weight of said grease, said parting agent being sufficiently plastic to permit radial and axial expansive movement of said pipe therein.

4. The conduit assembly of claim 1 in which said light-weight aggregate is vermiculite.

5. The conduit assembly of claim 3 in which said light-weight aggregate is perlite.

References Cited in the file of this patent

UNITED STATES PATENTS

| | | |
|---|---|---|
| 400,308 | Cranmer | Mar. 26, 1889 |
| 771,594 | Wilhelmi | Oct. 4, 1904 |
| 1,549,406 | De La Mare | Aug. 11, 1925 |
| 2,322,738 | Rouse | June 22, 1943 |
| 2,444,271 | Smith | June 29, 1948 |
| 2,486,822 | Cameron | Nov. 1, 1949 |
| 2,749,393 | Fuchs | June 5, 1956 |
| 2,774,383 | Kidd | Dec. 18, 1956 |

FOREIGN PATENTS

| | | |
|---|---|---|
| 3,773 | Great Britain | Sept. 28, 1876 |
| 499,338 | Great Britain | Jan. 23, 1939 |
| 562,035 | Great Britain | June 15, 1944 |

OTHER REFERENCES

Manufacture and Application of Lubricating Greases, pp. 773–4, Boner, Reinhold Publishing Corp., 1954, N.Y., N.Y.